United States Patent
Koning

(10) Patent No.: US 8,423,740 B2
(45) Date of Patent: Apr. 16, 2013

(54) SYSTEM AND METHOD FOR FAST BOOT FROM NON-VOLATILE MEMORY

(75) Inventor: Maarten Koning, Bloomfield (CA)

(73) Assignee: Wind River Systems, Inc., Alameda, CA (US)

(*) Notice: Subject to any disclaimer, the term of this patent is extended or adjusted under 35 U.S.C. 154(b) by 264 days.

(21) Appl. No.: 13/018,728

(22) Filed: Feb. 1, 2011

(65) Prior Publication Data

US 2012/0198283 A1 Aug. 2, 2012

(51) Int. Cl.
*G06F 13/00* (2006.01)
(52) U.S. Cl.
USPC .............................. 711/165; 711/154; 711/156
(58) Field of Classification Search .................. 711/154, 711/156, 165
See application file for complete search history.

(56) References Cited

U.S. PATENT DOCUMENTS

2010/0332727 A1* 12/2010 Kapil et al. .................... 711/103

* cited by examiner

*Primary Examiner* — Reba I Elmore
(74) *Attorney, Agent, or Firm* — Fay Kaplun & Marcin, LLP

(57) ABSTRACT

Described herein are systems and methods for fast boot from non-volatile ("NV") memory. The exemplary embodiments relate to systems and methods for significant improvements in performance speed with simple implementations. One embodiment relates to a non-transitory computer readable storage medium including a set of instructions executable by a processor, the set of instructions operable to identify a page fault, determine whether the page fault occurred due to a read from a NV memory, copy a page from the NV memory to a random-access memory ("RAM") storage, and create an identity mapping for the page in the RAM storage. A further embodiment relates to a system comprising a NV memory, a random access memory, and a processor executing a set of instructions, wherein the set of instructions being operable to identify a page fault, determine whether a page fault occurred due to a read from the NV memory, copy a page from the NV memory to the RAM storage, and create an identity mapping for the page in the RAM storage.

20 Claims, 2 Drawing Sheets

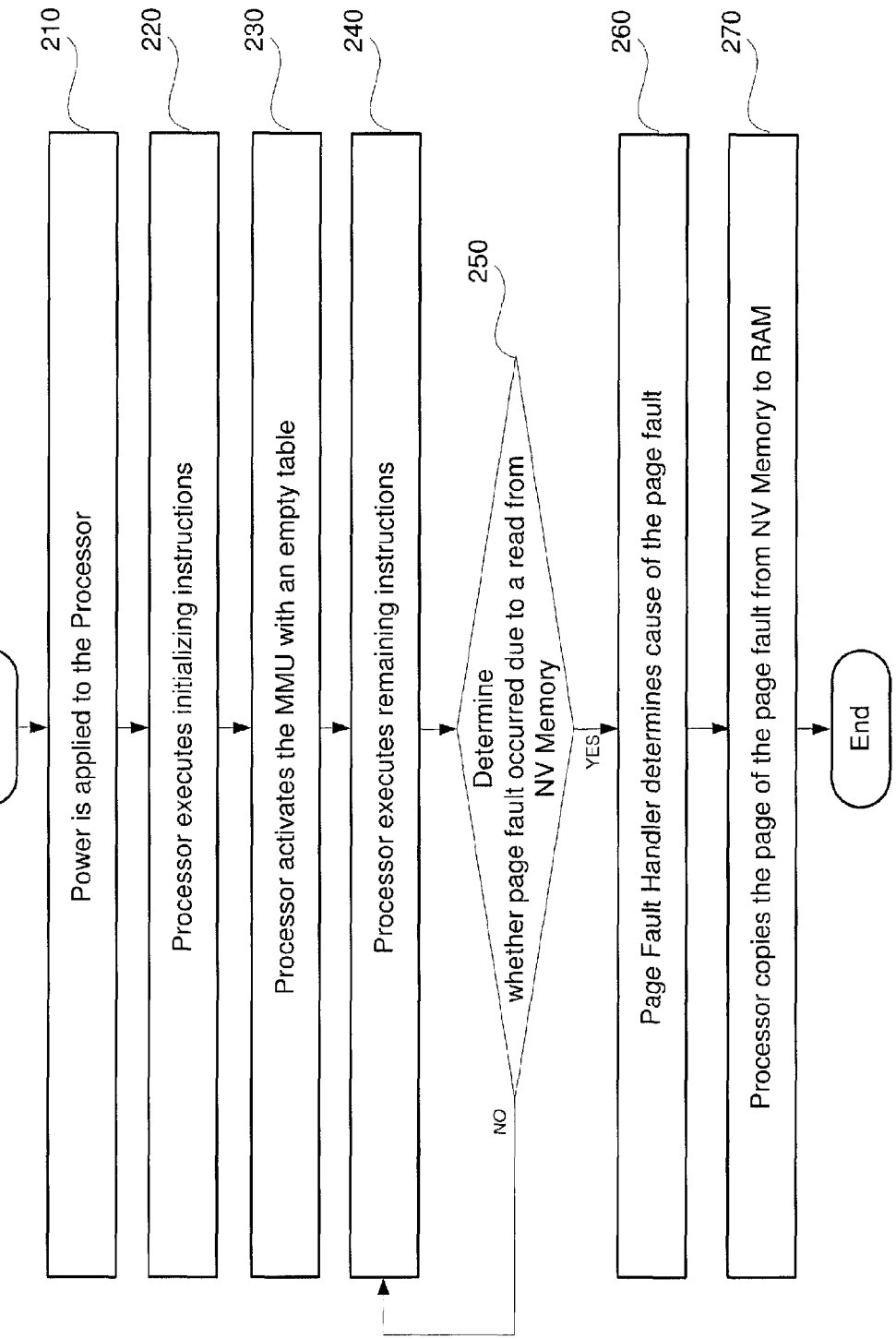

SYSTEM AND METHOD FOR FAST BOOT FROM NON-VOLATILE MEMORY

BACKGROUND

Non-volatile ("NV") memory or non-volatile storage, may be described as computer memory that is capable of retaining stored information even when not powered. Examples of non-volatile memory include read-only memory, flash memory, most types of magnetic computer storage devices (e.g. hard disks, floppy disks, and magnetic tape), optical discs, and early computer storage methods such as paper tape and punch cards.

Non-volatile memory is typically used for the task of secondary storage, or long-term persistent storage. The most widely used form of primary storage today is a volatile form of random access memory ("RAM"), meaning that when the computer is shut down, anything contained in RAM is lost. Unfortunately, most forms of non-volatile memory have limitations that make them unsuitable for use as primary storage. Typically, non-volatile memory either costs more or performs worse than volatile random access memory.

SUMMARY OF THE INVENTION

Described herein are systems and methods for fast boot from non-volatile ("NV") memory. The exemplary embodiments relate to systems and methods for significant improvements in performance speed with simple implementations. One embodiment relates to a non-transitory computer readable storage medium including a set of instructions executable by a processor, the set of instructions operable to identify a page fault, determine whether the page fault occurred due to a read from a NV memory, copy a page from the NV memory to a random-access memory ("RAM") storage, and create an identity mapping for the page in the RAM storage.

A further embodiment relates to a system comprising a NV memory, a random access memory, and a processor executing a set of instructions, wherein the set of instructions being operable to identify a page fault, determine whether a page fault occurred due to a read from the NV memory, copy a page from the NV memory to the random-access memory ("RAM") storage, and create an identity mapping for the page in the RAM storage.

A further embodiment relates to a fast boot system, comprising a fault handling means identifying a page fault, a processing means determines whether a page fault occurred due to a read from a NV memory, a copying means copying a page from the NV memory to a random-access memory ("RAM") storage, and a mapping means creating an identity mapping for the page in the RAM storage.

BRIEF DESCRIPTION OF THE DRAWINGS

FIG. 2 shows an exemplary embodiment of a method for fast boot initialization of an operating system from NV memory according to the exemplary embodiments described herein.

DETAILED DESCRIPTION

Figure 1:
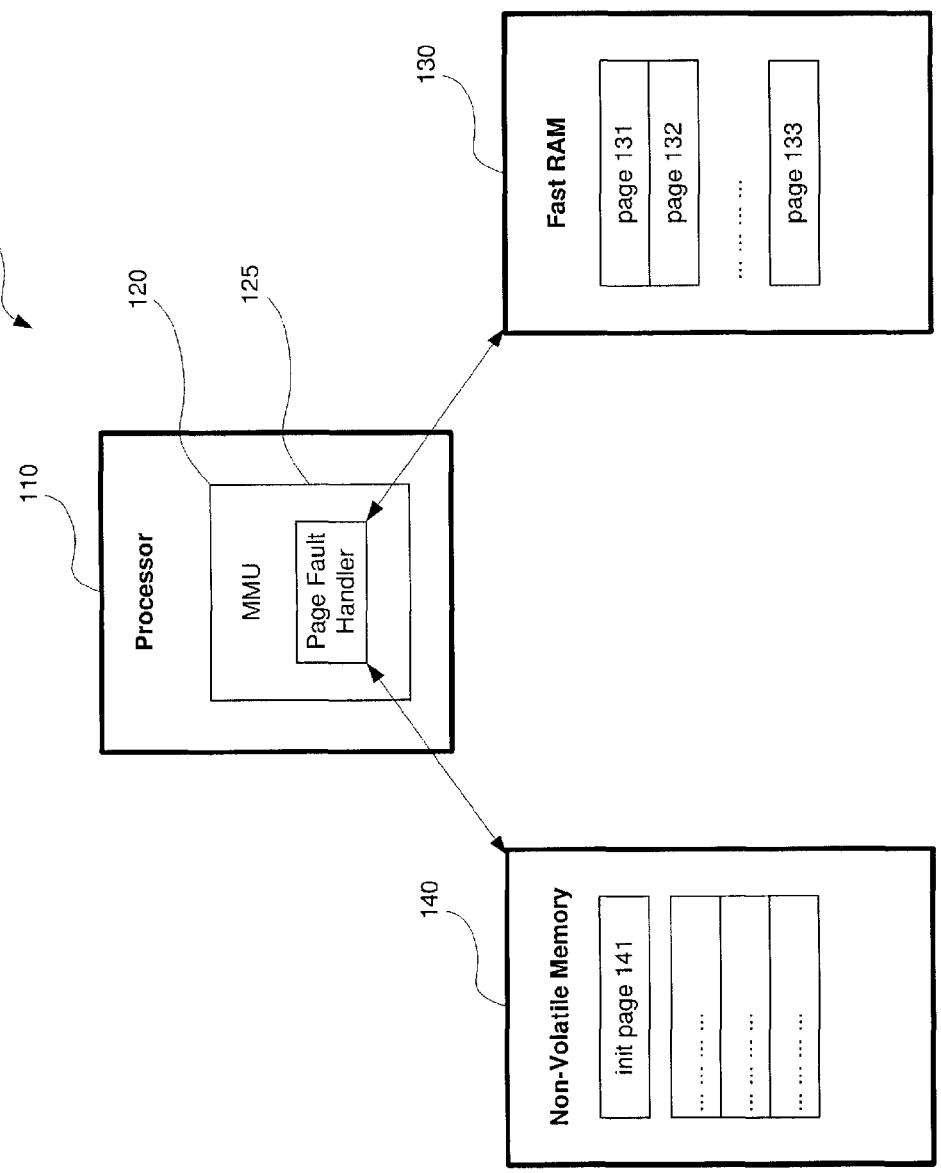
FIG. 1 shows an exemplary embodiment of a system for fast boot initialization of an operating system from non-volatile ("NV") memory according to the exemplary embodiments described herein.

The exemplary embodiments may be further understood with reference to the following description and the appended drawings, wherein like elements are referred to with the same reference numerals. The exemplary embodiments described herein relate to systems and methods for fast boot from non-volatile ("NV") memory. Specifically, the exemplary embodiments relate to systems and methods for significant improvements in performance speed with simple implementations. For example, the exemplary embodiments may increase power-on initialization speed through copying information from a NV memory to random access memory ("RAM").

As will be described below, the exemplary embodiments describe methods and systems for fast initialization, or boot, of an operating system using NV memory. Specifically, when power is applied to an exemplary processor, the processor may execute a set of instructions from NV memory. Examples of NV memory may include, but are not limited to, a read-only memory ("ROM"), an erasable programmable read only memory ("EPROM"), a electrically-erasable programmable read-only memory ("EEPROM"), and a flash memory.

According to the exemplary embodiments, the methods and systems may be implemented on a processor including a memory management unit ("MMU"), as well as the ability to catch page faults and handle these page faults. As opposed to using a large copy command, such as bcopy( ), when power is applied, pages may be copied "on-demand" from a slow non-volatile memory to a fast non-volatile memory (e.g., RAM, etc.) using the MMU. A conventional bcopy( ) or memcpy( ) function is typically used to copy a block of data (e.g., a predetermined number of bytes) from one location to another. For example, a bcopy( ) function may perform a byte string copy of n bytes from a source string to a destination string.

As will be described in greater detail below, the exemplary embodiments described herein may utilize a page-by-page process for significant improvement in initialization performance and speed. The initialization instructions for the exemplary processors may be included in a page of the NV memory, namely an initialization page or an "init" page.

While the exemplary embodiments will be described with reference to pages (e.g., memory pages, virtual pages, etc.), those skilled in the art will understand that the exemplary systems and methods may be implemented with any fixed-length block of memory allocation performed by an operating system. According to the exemplary embodiments, the term "memory" may include, but is not limited to, any non-transitory computer readable storage medium that may be utilized by the application. Furthermore, the term "page" may refer to block of fixed storage within the memory, and "paging" may refer to a memory management scheme in which an operating system may store and retrieve data from one or more pages. Accordingly, a page fault may be described as an interrupt, or exception, to a software application presented by hardware. Specifically, a page fault may occur when a program accesses a page that is mapped in address space, but is not loaded in the memory.

Furthermore, the exemplary embodiments of the systems and methods described herein may utilize an MMU of an exemplary processor for detecting page fault situations. One skilled in the art would understand that an MMU may be described as a computer hardware component responsible for handling accesses to memory requested by the processor. For instance, the functions of the MMU may include translation of virtual addressed to physical addresses (e.g., "virtual memory management"), memory protection, cache control, bus arbitration, bank switching, etc. An exemplary processor including an MMU will be described in greater detail below.

FIG. 1 shows an exemplary embodiment of a system 100 for fast boot initialization of an operating system from non-volatile ("NV") memory of a computing device according to the exemplary embodiments described herein. The system 100 may include a processor 110, a memory management unit ("MMU") 120, a page fault handler 125, a fast RAM 130, and a non-volatile ("NV") memory 140 (e.g., ROM, EPROM, flash, etc.).

The page fault handler 125 may be described as a hardware or software component of the operating system for detecting faults and performing exception handling. The page fault handler 125 may be a component within the MMU 120. Alternatively, the page fault handler 125 may be a stand-alone component within the system 100. It should be noted that the exemplary fast RAM 130 may include any number of memory components such as, but not limited to, CPU registers, on-die static random access memory ("SRAM") caches, external caches, DRAM, paging systems, and virtual memory on a physical memory (e.g., a hard drive).

The MMU 120 may divide a range of addresses in the space of the fast RAM 130 into "pages." This range of address may be referred to as a virtual memory. One skilled in the art would understand that a page, or "virtual page," may be described as a fixed-length block of the virtual memory 130 that is contiguous in both physical memory addressing and virtual memory addressing. Accordingly, a page may be the smallest unit of data for memory allocation performed by the operating system for a program, as well as for transfer between main memory and any other auxiliary store, such as hard disk drive.

The exemplary processor 110 of the computing device may be capable of executing instructions from the fast RAM 130, such as, for example, instructions within a plurality of pages 131-133 from the fast RAM 130. Furthermore, the NV memory 140 may include a plurality of page, such as an initialization page or an "init" page 141. Accordingly, the processor 110 may execute the init page 141 from the NV memory 140 via the MMU 120. According to an exemplary embodiment, the MMU 120 coupled to the processor 110 may be capable of catching any page faults that may occur, as well as addressing any corresponding issues. It should be noted that, while not depicted in FIG. 1, several additional computer hardware elements may be present within system 100.

The exemplary instructions may be written in any programming language (e.g., C/C++, Java, Assembly language, etc.), and may be divided into any number of smaller parts, such as subsets, etc. Each of these subsets may be executable code defined by a sequence of code extending from an initial memory addresses (e.g., a text start address, a data start address, a block started by symbol ("BSS") start address, etc.) to a final memory address. Accordingly, the subsets may include linker script that denote where the text, data, and BSS sections fit into the instructions. The BSS section may be described as part of the data segment containing statically-allocated variables represented solely by zero-valued bits initially, such as, for example, when execution begins. The BSS section may be mapped into a portion of memory that is initialized to zero by the C run-time system before main( ) is entered.

According to the exemplary embodiments described herein, the instructions within the init page 141 may activate the MMU 120 with an empty page table. However, this empty page table may lack any identity mapping for the init 141. Identity mapping may be described as equating a virtual memory address with a physical memory address. The exemplary instructions may continue to execute when the MMU 120 is activated.

During this time, the installed page fault handler 125 may determine whether or not a page fault occurs. It should be noted that a page fault may occur for any number of reasons. Specifically, hardware may generate a page fault for page accesses wherein the page corresponding to the requested address is not loaded in memory, or wherein the page corresponding to the memory address accessed is loaded, but its present status may not be updated in the hardware, etc. For example, a page fault may occur due to a read, or an instruction fetch, from the NV memory 140.

If the page fault handler 125 does detect the occurrence of a page fault, the page may be copied to the fast RAM 130. In addition, an identity mapping may be created for the page. Accordingly, this mechanism enables the processor 110 to boot without copying an NV boot image to the RAM 130 in a large copy command. The NV boot image may be described as boot image (e.g., a disk image, computer file, etc.) containing the complete contents and structure of the NV memory 140. Due to the size of the complete NV boot image, copying the image to the RAM 130 would typically be very time consuming. However, as opposed to copying the entire NV image, the processor 110 of the exemplary system 100 may copy "on-demand" in order to allow for the operating system, as well as the computing device, to provide service much more quickly than in traditional booting techniques.

In other words, the information copied from the NV memory 140 may be limited to the code and the data used to initially provide the boot-time sensitive device service. Services requiring more code to be copied from the NV that are lower in priority can execute still but, according to the exemplary embodiments described herein, the size of their code does not delay the boot-time sensitive code from providing such service. For example, when a car starts, the code that initializes the dash board gauge displays may be copied on-demand from the flash to appear to have "instant-on" behavior while much larger subsystems, such as the navigation subsystem, may execute in the background and its code may load on-demand from the same flash.

It should be noted that the exemplary instructions may be created on an operating system of a host-computing device and executed on a target device. This type of development is typical for embedded devices. An embedded device is any device that includes a processor or microcontroller that executes the instructions to carry out desired functions. Normally, an embedded device has fewer resources than a general-purpose computer, such as having a slower processor, less memory (cache, RAM, Flash, etc.), etc. Examples of embedded devices include mobile phones, personal digital assistants, smart phones, smart process monitoring devices (e.g., thermostats, pressure sensors, flow sensors, etc.), etc.

The exemplary embodiments will be described with reference to increasing power-on initialization speed for such embedded devices. However, those skilled in the art will understand that the present invention may be implemented in, for example, any type of computing device. In particular, software payloads for embedded devices are often comprised of a single image that is not able to dynamically load more code in order to defer the load cost. Even if it is possible to dynamically load a piece of the code to defer its load cost, the locus of execution is not normally known ahead of time to partition a system into such pieces. The exemplary embodiments described herein may allow for a system programmer to optimally initialize the boot-time for the code that executes first in such a system without having to completely understand which code that is, or to disentangle linkage-wise the code from other lower-priority software. Furthermore, it is common for embedded devices to have priority-base schedulers. In such systems, the exemplary embodiments may be able to automatically defer the code loading for the lower-priority tasks, since the code is loaded when the tasks execute and not before. Without the use of the exemplary systems and methods described herein, all the code in a fully linked software image is loaded prior to the execution on any code.

FIG. 2 shows an exemplary embodiment of a method 200 fast boot initialization of an operating system from non-volatile ("NV") memory according to the exemplary embodiments of the present invention. It should be noted that the exemplary method 200 will be discussed with reference to the processor 110 and the system 100 of FIG. 1.

The method 200 may allow for a computing device to increase the power-on initialization speed when power is applied to the processor 110 of the computing device. Therefore, as described above, the method 200 may allow for on-demand, page-by-page copying of data from the slower NV memory 120 to the fast RAM storage 130. Accordingly, the exemplary method 200 may translate to a significantly improved performance and boot speed.

In step 210, power may be applied to the exemplary processor 110. For instance, this may occur during the activation of the computing device containing the processor 110. Accordingly, when the computing device is switched on, power is applied to the processor 110 in order to initiate a boot sequence, or initial set of operations.

In step 220, the processor 110 may execute an initializing set of instructions from the NV memory 140. The set of instructions may be available from an initialization page, or init page 141, within the NV memory 140.

In step 230, the processor 110 may activate the MMU 120 with an empty page table. Specifically, the set of instructions from the init page may activate the MMU 120 with an empty page table, except for an identity mapping for this init page within the NV memory 140. In step 240, the remaining set of instructions may continue to execute while the MMU 120 is activated.

In step 250, the page fault handler 125 of the MMU 120 may catch a page fault. If a page fault does occur, the exemplary method 200 may advance to step 260. However, if no page fault is detected, the method 200 may return to step 240, wherein the set of instructions continue to execute.

In step 260, the page fault handler 125 may determine the cause of the page fault. As described above, the page fault handler 125 may determine if a page fault occurs due to a read (or an instruction fetch) from within the NV memory 140. Alternatively, a write may also cause a page fault. For instance, if a variable is written to that has not yet been copied out of flash into RAM, then that page copy needs to occur first.

In step 270, the processor 110 may copy the page of the page fault from the non-volatile memory to a random-access memory ("RAM") storage 130. As described above, the exemplary method 200 allow for the copy process of step 270 to be performed on-demand (e.g., on a page by page basis). This on-demand copying enables the processor 110 to boot while avoiding the time-consuming task of copying the much larger NV image to the RAM storage 130. This is due to the fact that only the data that is used to provide the device service (e.g., the page under fault) would be copied from the NV memory 120.

Finally, in step 280, the processor 110 may create an identity mapping for the page in the RAM storage. As noted above, the creation of an identity mapping may allow for a virtual address of the page within the RAM storage 130 to be assigned based on the physical address of the page within the NV memory 120.

Identity mapped code or data loaded from flash is one exemplary possibility. According to an alternative embodiment, another possibility may be that the final destination of the code/data is not the same addresses as the location in flash. In this case, the copy may be the same operation, except that it is copied to a new location. Therefore, the RAM page does not have to be first mapped at a temporary address, and thus the bcopy( ) may see the page at the same time as the flash in order to perform the bcopy( ). In addition, by having the destination RAM addresses different from the flash addresses, this embodiment may mimic the traditional bootrom address scheme wherein the payload that is copied out to RAM is not at the same addresses as the flash.

It should be noted that, in addition to the steps 210-280 performed by the exemplary method 200, alternative embodiments may include further steps, such as, for example, comparing the speed of the NV memory 120 to the speed of the fast RAM 130. When the NV memory is as fast, or faster, than the fast RAM 130, the benefits of using the above-described method 200 of copy-on-execute. However, a further alternative embodiment may be utilized to leave a large data section in the fast NV memory and only copy a page out to the fast RAM 130 when it is first written. This alternative embodiment may be referred to as a copy-to-write method.

As noted above, the exemplary systems and methods may allow for significant improvements in the initialization speed and overall performance of the processor 110. If the NV memory 120 operates at a relatively slow speed, in comparison to the fast RAM memory 130, the exemplary copy-on-execute/read mechanism may be implemented in order to provide fast system initialization. However, if the operating speed of the NV memory 120 is fast (e.g., as fast or faster than the fast RAM 130), then the instruction code and read-only data may remain on the NV memory 120. Furthermore, the alternative copy-on-write mechanism may be implemented in order to copy out only data and BSS sections. It should be noted that BSS pages may be initialized to zero (e.g., "zeroed") when the BSS section is copied out. In addition, the BSS page may also be zeroed out when it is first read or written (e.g., triggered by page fault).

Furthermore, those skilled in the art will also understand that the above described exemplary embodiments may be implemented in any number of manners, including, as a separate software module, as a combination of hardware and software, etc. For example, the exemplary systems and methods may be implemented within a program containing lines of code stored in any type of non-transitory computer-readable storage medium that, when compiled, may be executed by a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions operable to:
   identify a page fault;
   determine whether the page fault occurred due to a read from a non-volatile memory;
   copy a page from the non-volatile memory to a random-access memory ("RAM") storage; and
   create an identity mapping for the page in the RAM storage.

2. The non-transitory computer readable storage medium of claim 1, wherein, during a boot, the processor uses on-demand page-by-page copying of the non-volatile memory to the RAM storage.

3. The non-transitory computer readable storage medium of claim 1, wherein the processor includes a memory management unit ("MMU") activated by instructions within an initialization page of the non-volatile memory.

4. The non-transitory computer readable storage medium of claim 3, wherein the MMU is activated during the determination of the page fault, the MMU including the identify mapping within a page table.

5. The non-transitory computer readable storage medium of claim 1, wherein the processor boots without copying a memory image from the non-volatile memory.

6. The non-transitory computer readable storage medium of claim 1, wherein a value of a block started by symbol ("BSS") page stored in the non-volatile memory is initialized to zero upon one of copying the BSS page, reading from the BSS page, writing to the BSS page, and triggering a BSS page fault.

7. The non-transitory computer readable storage medium of claim 1, wherein the non-volatile memory is one of a read-only memory ("ROM"), a erasable programmable read only memory ("EPROM"), a electrically-erasable programmable read-only memory ("EEPROM"), and a flash memory.

8. A system, comprising:
a non-volatile memory;
a random access memory; and
a processor executing a set of instructions, the set of instructions being operable to:
identify a page fault;
determine whether a page fault occurred due to a read from the non-volatile memory;
copy a page from the non-volatile memory to the random-access memory ("RAM") storage; and
create an identity mapping for the page in the RAM storage.

9. The system of claim 8, wherein, during a boot, the processor uses on-demand page-by-page copying of the non-volatile memory to the RAM storage.

10. The system of claim 8, wherein the processor includes a memory management unit ("MMU") activated by instructions within an initialization page of the non-volatile memory.

11. The system of claim 10, wherein the MMU is activated during the determination of the page fault, the MMU including the identify mapping within a page table.

12. The system of claim 8, wherein the processor boots without copying a memory image from the non-volatile memory.

13. The system of claim 8, wherein a value of a block started by symbol ("BSS") page stored in the non-volatile memory is initialized to zero upon one of copying the BSS page, reading from the BSS page, writing to the BSS page, and triggering a BSS page fault.

14. The system of claim 8, wherein the non-volatile memory is one of a read-only memory ("ROM"), a erasable programmable read only memory ("EPROM"), a electrically-erasable programmable read-only memory ("EEPROM"), and a flash memory.

15. A fast boot system, comprising:
a fault handling means identifying a page fault;
a processing means determines whether a page fault occurred due to a read from a non-volatile memory;
a copying means copying a page from the non-volatile memory to a random-access memory ("RAM") storage; and
a mapping means creating an identity mapping for the page in the RAM storage.

16. The system of claim 15, wherein, during a boot, the processor uses on-demand page-by-page copying of the non-volatile memory to the RAM storage.

17. The system of claim 15, wherein the processing means includes a memory management unit ("MMU") activated by instructions within an initialization page of the non-volatile memory.

18. The system of claim 17, wherein the MMU is activated during the determination of the page fault, the MMU including the identify mapping within a page table.

19. The system of claim 15, wherein the processing means boots without copying a memory image from the non-volatile memory.

20. The system of claim 15, wherein a value of a block started by symbol ("BSS") page stored in the non-volatile memory is initialized to zero upon one of copying the BSS page, reading from the BSS page, writing to the BSS page, and triggering a BSS page fault.

* * * * *